United States Patent [19]

Liu

[11] Patent Number: 5,556,347
[45] Date of Patent: Sep. 17, 1996

[54] TENSION DEVICE FOR BICYCLE CHAIN

[76] Inventor: Robert Z. Liu, No. 9 Alley 62, Lane 168, Feng Dong Road, Feng Yuan City, Taichung County, Taiwan

[21] Appl. No.: 527,693
[22] Filed: Sep. 13, 1995
[51] Int. Cl.⁶ .................................................. F16H 7/08
[52] U.S. Cl. ............................................................ 474/110
[58] Field of Search .................................... 474/101, 109, 474/111, 131

[56] References Cited

U.S. PATENT DOCUMENTS

| 616,619 | 12/1898 | James | 474/131 |
| 3,448,628 | 6/1968 | Shimano et al. | 474/111 X |
| 4,946,426 | 8/1990 | Leonard | 474/101 |

Primary Examiner—Roger J. Schoeppel
Attorney, Agent, or Firm—Morton J. Rosenberg; David I. Klein

[57] ABSTRACT

A tension device for tensioning a chain of a bicycle includes a coupler for securing to the bicycle. A bracket is rotatably secured to the coupler and has a pair of lugs. A shaft is engaged between the lugs for rotatably supporting a sprocket which may engage with the chain so as to tension the chain. The sprocket and the bracket are rotatable relative to the coupler for suitably supporting the chain in place. The distance between the sprocket and the bracket is smaller than the width of the chain so as to prevent the chain from disengaging from the sprocket.

2 Claims, 5 Drawing Sheets

TENSION DEVICE FOR BICYCLE CHAIN

BACKGROUND OF THE INVENTION

1. Field of the Invention

The present invention relates to a tension device, and more particularly to a tension device for tensioning the chain of the bicycles.

2. Description of the Prior Art

Typical chains are rotatably coupled between two sprocket wheels. For multi-speed bicycles, a tension pulley and a guide pulley are provided for tensioning the chain of the bicycle. However, the pulleys may not be rotated relative to the chains such that the chain may become loose when the chain is shifted from one of the sprockets to the other sprocket.

The present invention has arisen to mitigate and/or obviate the afore-described disadvantages of the conventional chains.

SUMMARY OF THE INVENTION

The primary objective of the present invention is to provide a tension device for tensioning the chain of bicycles.

In accordance with one aspect of the invention, there is provided a tension device secured to a bicycle for tensioning a chain of a bicycle, the tension device comprises a coupler including two jaw members secured together so as to define a space therein for coupling to the bicycle, a bracket rotatably secured to the coupler and including a pair of lugs, and a sprocket rotatably supported between the lugs and provided for engaging with the chain so as to tension the chain. The sprocket and the bracket are rotatable relative to the coupler for suitably supporting the chain in place, the sprocket and the bracket include a distance smaller than a width of the chain so as to prevent the chain from disengaging from the sprocket.

The bracket includes a shaft engaged between the lugs for rotatably supporting the sprocket, and includes a pair of stop means engaged on the shaft and engaged beside the chain so as to retain the chain in place and so as to prevent the chain from disengaging from the sprocket.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
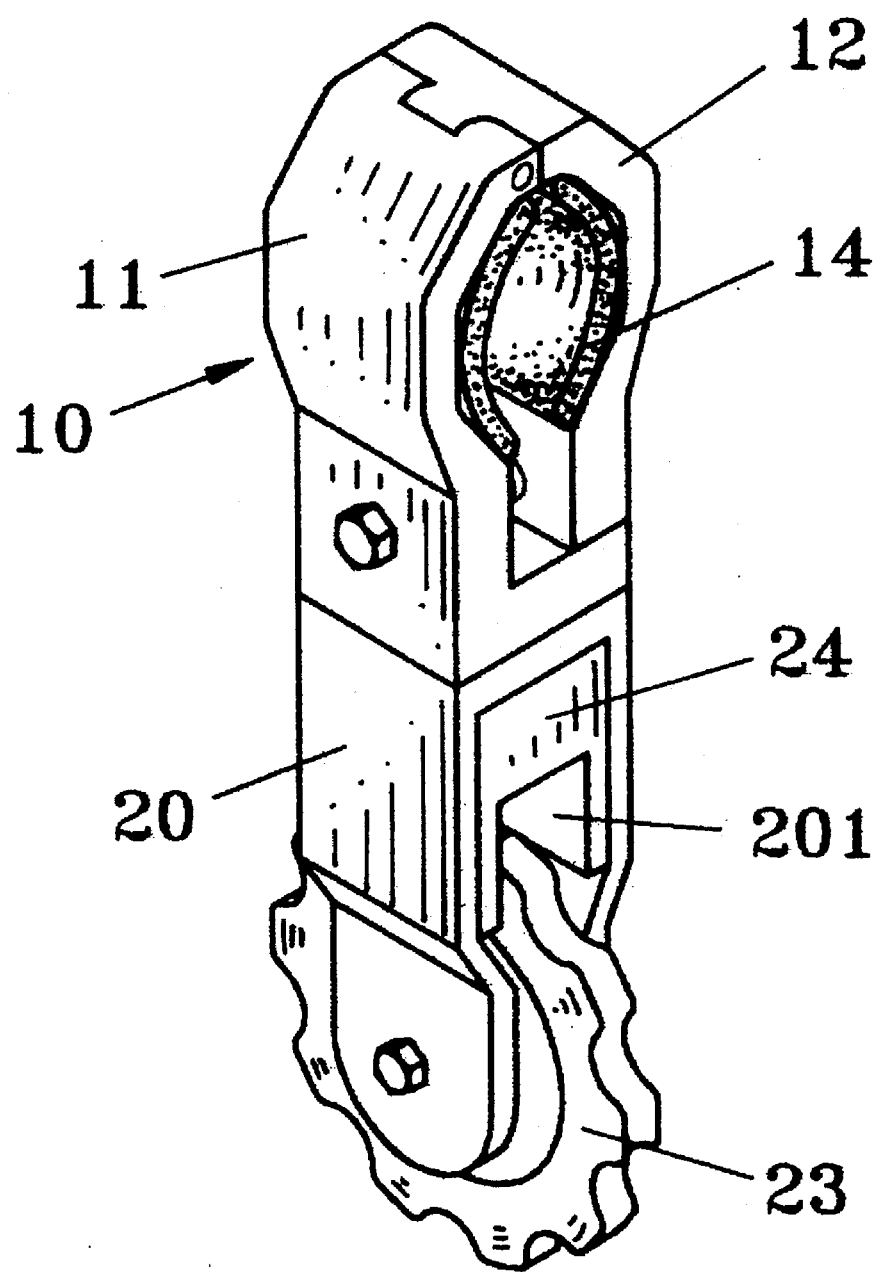
FIG. 1 is a perspective view of a tension device in accordance with the present invention.
Figure 2:
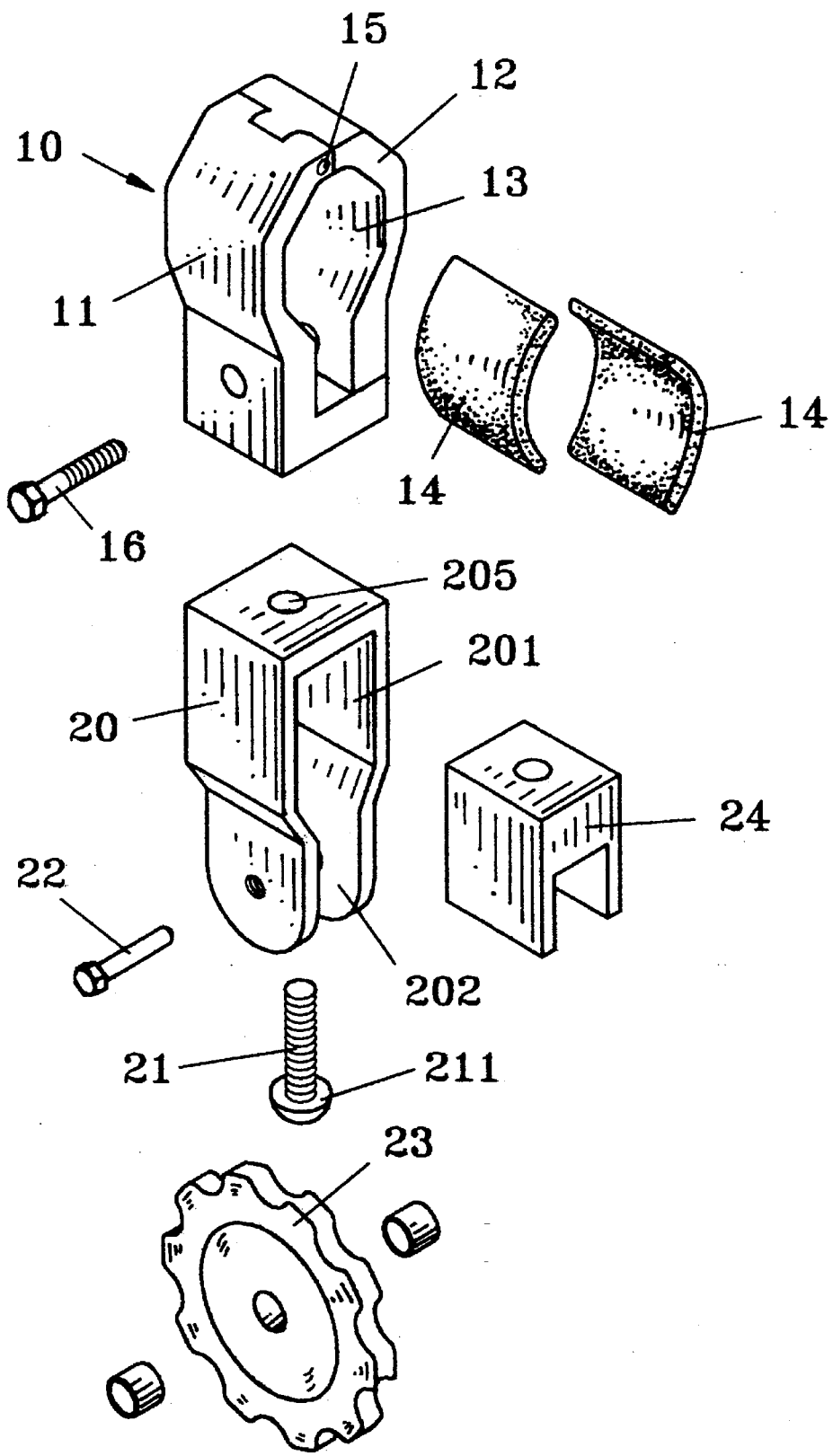
FIG. 2 is an exploded view of the tension device.

Referring to the drawings, and initially to FIGS. 1 and 2, a tension device in accordance with the present invention is provided for tensioning the chains of the bicycles and comprises a coupler 10 including a pair of jaw members 11, 12 defining a space 13 therein for engaging with bicycle frame. A pair of curved packings 14 are engaged within the space 13 and engaged between the bicycle frame and the jaw members 11, 12 for protecting the bicycle frame and the jaw members 11, 12. The jaw members 11, 12 include an upper portion pivotally coupled together at a pivot pin 15 and include a lower portion secured together by bolt 16.

Figure 3:
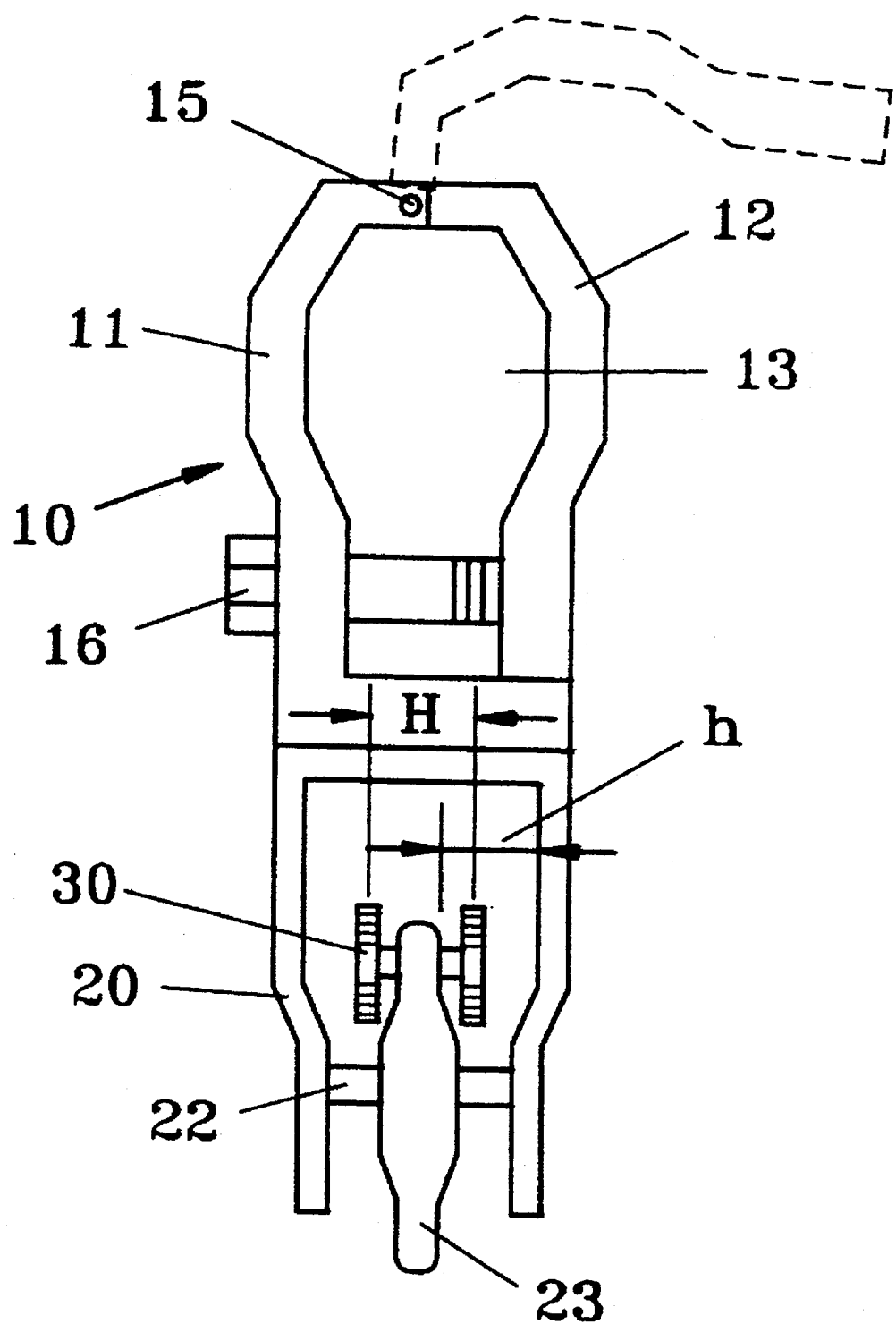
FIG. 3 is a plane view of the tension device.
Figure 4:
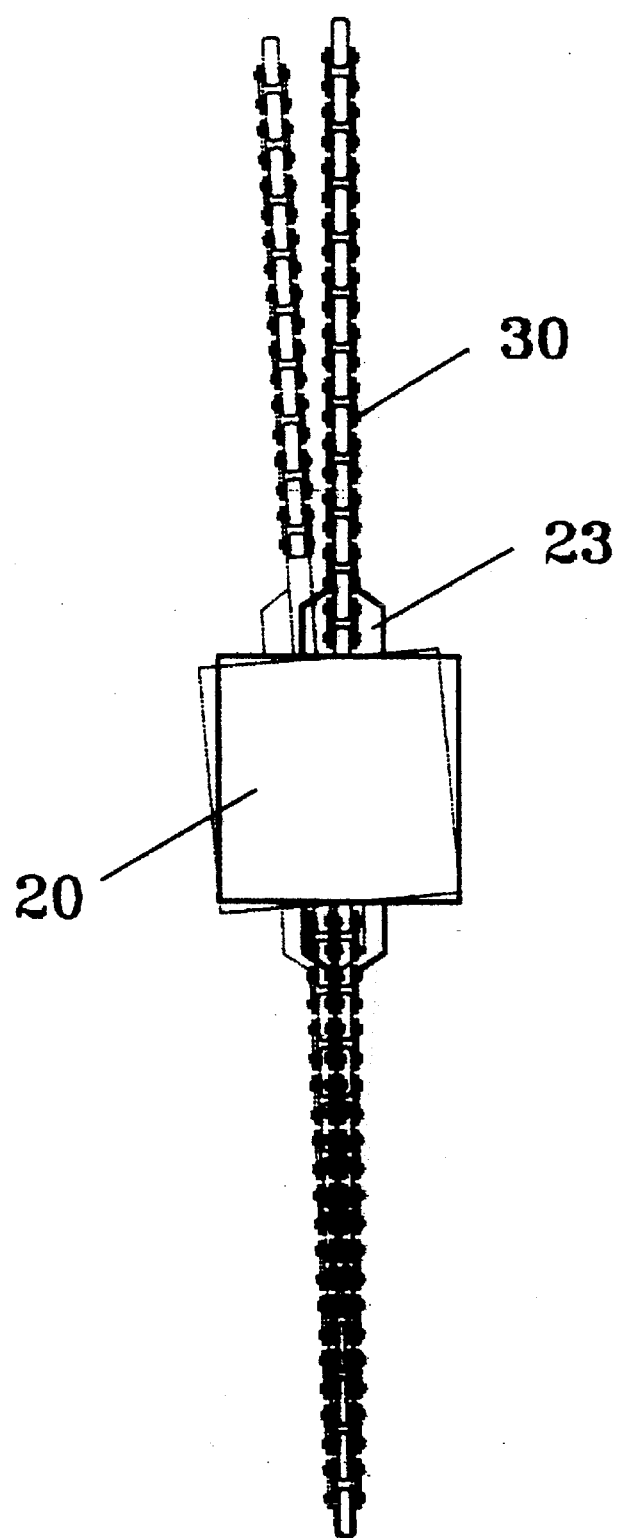
FIG. 4 is a schematic view illustrating the operation of the tension device.

A bracket 20 includes an opening 201 formed therein for engaging with a resilient pad 24 and includes a pair of lugs 202 having a shaft 22 secured therebetween. A gear or a sprocket 23 is rotatably supported on the shaft 22 for engaging with and for tensioning the chain 30 (FIGS. 3 and 4). A bolt 21 is engaged through a hole 205 formed in top of the bracket 20 and is engaged with the coupler 20 so as to rotatably secure the bracket 20 to the coupler 10. The bolt 21 includes a head 211 for engaging with the bracket 20 so as to rotatably support the bracket 20 in place, such that both the bracket 20 and the sprocket 23 may rotate relative to the coupler 10 about the bolt 21. The resilient pad 24 is provided for preventing the chain 30 from damaging or scraping the bracket 20.

In operation, as shown in FIGS. 3 and 4, the sprocket 23 may engage with the chain 30 so as to tension and to retain the chain 30 in place. When the chain 30 is laterally moved between the sprockets of the multi-speed sprocket wheel assembly of the bicycle, both the sprocket 23 and the bracket 20 may rotate relative to the coupler 10 according to the movement of the chain such that the chain 30 may be maintained in a substantially straight configuration.

It is to be noted that, as shown in FIG. 3, the distance "h" between the sprocket 23 and the inner surface of the bracket 20 is less than the width "H" of the chain 30 such that the chain 30 may be stably retained in place and will not be disengaged from the sprocket 23. In addition, only a small gap is formed between the chain 30 and the inner and upper surface of the bracket 20 such that the chain 30 may further be stably retained in place and will not be disengaged from the sprocket. The resilient pad 24 may further be engaged in the bracket 20 (FIG. 1) for preventing the chain 30 from disengaging from the sprocket 23.

Figure 5:
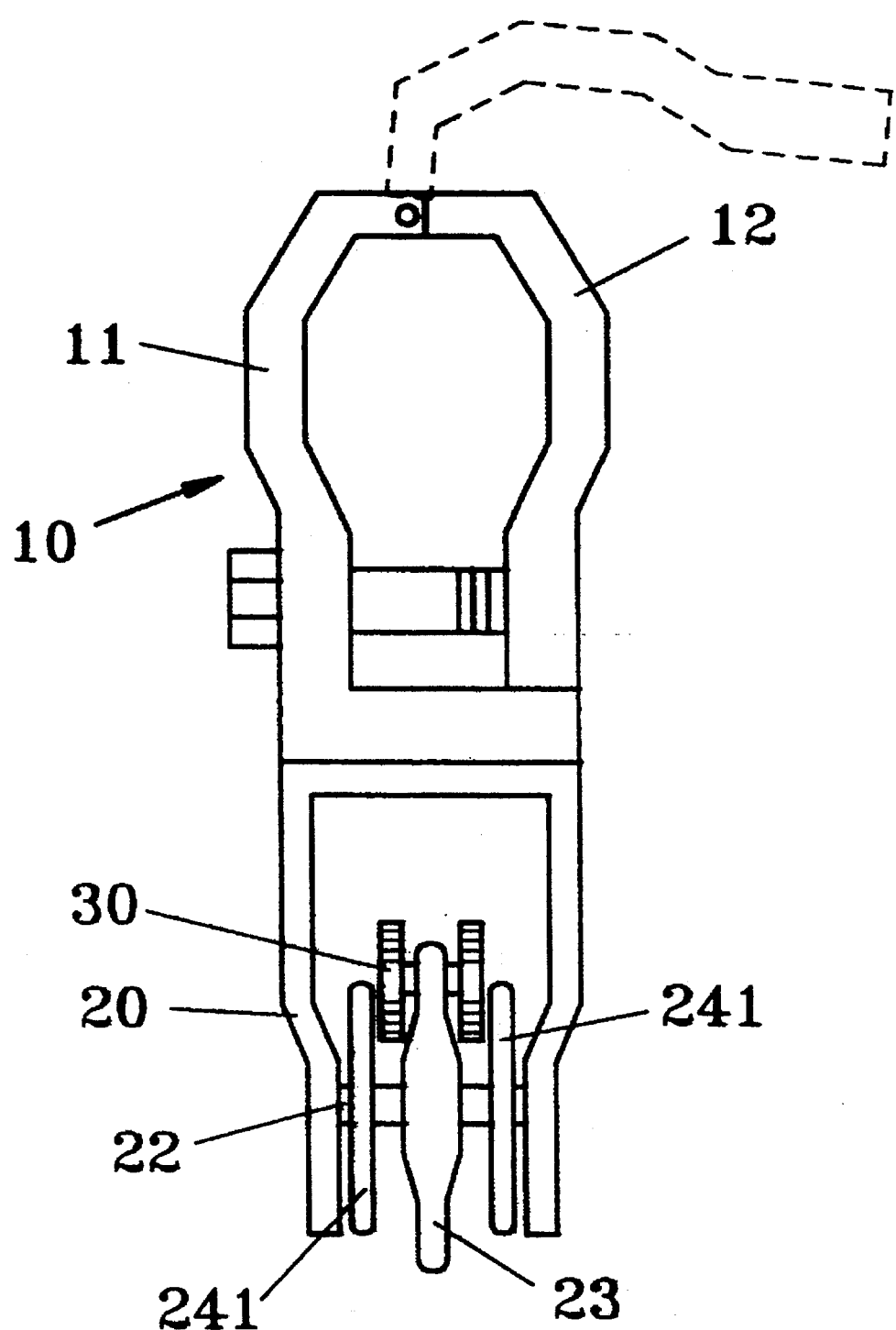
FIG. 5 is a plane view showing another application of the tension device.

Referring next to FIG. 5, two stop members 241 are further engaged on the shaft 22 and engaged beside the chain 30 so as to further stably retain the chain 30 in place and so as to prevent the chain 30 from disengaging from the sprocket 23.

Accordingly, the tension device in accordance with the present invention includes a sprocket for engaging with the chain and for rotating relative to the coupler so as to suitably retain the chain in suitable position.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tension device for tensioning a chain of a bicycle, said tension device comprising:

a coupler including two jaw members secured together so as to define a space therein for coupling to the bicycle, a bracket rotatably secured to said coupler and including a pair of lugs, and a sprocket rotatably supported between said lugs and provided for engaging with the chain so as to tension the chain, said sprocket and said bracket being rotatable relative to said coupler for suitably supporting the chain in place, said sprocket and said bracket including a distance smaller than a width of the chain so as to prevent the chain from disengaging from said sprocket.

2. A tension device according to claim 1, wherein said bracket includes a shaft engaged between said lugs for rotatably supporting said sprocket, and includes a pair of stop means engaged on said shaft and engaged beside the chain so as to retain the chain in place and so as to prevent the chain from disengaging from said sprocket.

* * * * *